United States Patent

Faust

[11] 3,857,885
[45] Dec. 31, 1974

[54] PHOTOPOLYMERIZABLE COMPOUNDS

[75] Inventor: Raimund Josef Faust, Wiesbaden-Biebrich, Germany

[73] Assignee: Kalle Aktiengesellschaft, Wiesbaden-Biebrich, Germany

[22] Filed: Dec. 28, 1971

[21] Appl. No.: 213,170

[30] Foreign Application Priority Data
Dec. 31, 1970  Germany............................ 2064742

[52] U.S. Cl. .............................. 260/561 N, 96/115
[51] Int. Cl. ..................................... C07c 103/30
[58] Field of Search ............................... 260/561 N

[56] References Cited
OTHER PUBLICATIONS

Murfin et al., Journal Polymer Science, A–1, Vol. 8, 1967-1980, August, 1970.

Primary Examiner—Lewis Gotts
Assistant Examiner—Ethel G. Love
Attorney, Agent, or Firm—James E. Bryan, Esq.

[57] ABSTRACT

This invention relates to a photopolymerizable compound of the general formula

I

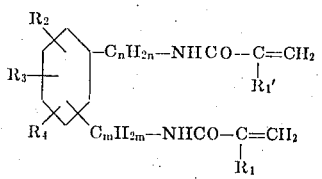

wherein $R_1$ and $R_1'$ are selected from the group consisting of hydrogen atoms or methyl groups, $R_2$, $R_3$, $R_4$ are selected from the group consisting of hydrogen atoms or alkyl groups with 1 to 4 carbon atoms, $m$ is 0, 1 or 2, and $n$ is 1 or 2.

5 Claims, No Drawings

PHOTOPOLYMERIZABLE COMPOUNDS

This invention relates to new photopolymerizable compounds as well as to copying compositions prepared therewith which are eminently suitable for the production of relief and screen printing forms.

It is known to produce relief printing forms from photopolymerizable copying compositions containing high molecular weight polyamides, polymerizable monomers and photoinitiators. The printing forms obtained are distinguished by excellent mechanical properties, particularly by a very high abrasion resistance. They thus yield long printing runs. These light-sensitive copying compositions containing polyamides have certain disadvantages, however. It is extremely difficult to combine suitable polyamides with suitable monomers to give storable compatible layers. When using monomers of low polarity, e.g. acrylic and methacrylic esters of trimethylol ethane, trimethylol propane, pentaerythritol, polyethylene glycols and other polyhydric alcohols, these monomers have a tendency to exude from the polar polyamide. When using polar monomers, these normally crystalline compounds can be dissolved homogeneously in the polyamide only in low concentrations without recrystallizing. Such photopolymer layers have too low a light-sensitivity. When attempting to improve the light-sensitivity by higher monomer concentrations, turbidity, crystallization and other difficulties occur. As polar photomonomers, there hitherto have been primarily used bis-acrylamides and bis-methacrylamides of alkylene diamines (see British Pat. No. 875,378 or U.S. Pat. No. 3,081,168). These monomers, such as methylene bisacrylamide, hexamethylene bisacrylamide, isobutylene bisacrylamide or N,N'-diisopropyl hexamethylene bisacrylamide, are distinguished by a pronounced tendency to crystallize from the polyamide, also in lower concentrations, i.e., below about 20 per cent by weight.

Somewhat better are certain aromatic bis-acrylamides and bis-methacrylamides as described in German Offenlegungsschriften Nos. 1,522,469 and 1,522,470. Problems regarding compatibility are involved with these monomers, also. It is not readily possible to obtain transparent printing foils as light-sensitive as possible, e.g., with m- or p-xylylene bisacrylamide or m- or p-xylylene bismethacrylamide in combination with mixed polyamides without additions of other compatibility-improving auxiliary substances or other monomers, because these monomers tend to crystallize from the mixed polyamide. The mixed polyamide used was a condensation product of equal parts of caprolactam, hexamethylene diammonium adipate and p,p'-diammonium cyclohexyl methane adipate. The crystallization tendency of these polar acrylamides may be reduced for a certain time by the addition of liquid monomers of the above type, e.g., with triethylene glycol diacrylate. In the case of a somewhat longer storage, crystalline blooming and turbidity are observed here, also. Also ethers of the methylol acrylamide (see German Offenlegungsschrift No. 1,522,463), e.g., the ethylene glycol bis-ether of the N-methylol acrylamide, are completely free from the tendency to form exudations in the above-described polyamide.

It further has been attempted to solve the problem of the compatibility of polyamides with monomers by providing the polyamides with compatibility-improving lateral groups. For this purpose, polyamides were reacted with formaldehyde and the resulting methylol groups then etherified. These polyamides, however, have the tendency to undesirable cross-linkages during processing. Furthermore, such polyamide relief printing plates are storable only briefly.

In some cases, it is possible to improve the compatibility of the monomers with polyamides by the addition of auxiliary substances. These substances, however, must be used in relatively high concentrations so that the mechanical properties of the layers are affected very adversely.

The present invention provides polymerizable compounds which are more compatible with polyamides in copying layers.

The present invention provides photopolymerizable compounds of the general formula I:

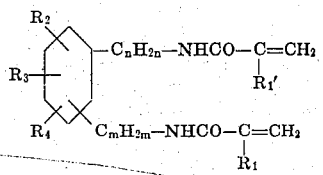

wherein
R$_1$ and R$_1'$ are hydrogen atoms or methyl groups,
R$_2$, R$_3$, and R$_4$ are hydrogen atoms or alkyl groups with 1 to 4 carbon atoms,
$m$ is 0, 1 or 2, and
$n$ is 1 or 2.

The compounds of the invention may be used for the preparation of homopolymers and copolymers, of light-hardenable composite materials, and for other purposes. They are particularly advantageously used for the production of photopolymerizable copying compositions, particularly those which contain linear polyamides and are employed for the production of relief or screen printing forms.

The copying compositions may be commercially utilized in known manner in the form of a solution or dispersion in a suitable solvent, e.g., as a screen printing composition, or in the form of a solid light-sensitive layer which may be self-supporting or applied to a suitable support.

Of the monomers of the invention, the acrylic amides are generally preferred since they polymerize somewhat more rapidly. A particularly good compatibility with copying layers containing polyamides is exhibited by the monomers with as many methyl groups as possible in the amine radical, i.e., when R$_2$, R$_3$, and R$_4$ are methyl groups.

Furthermore, compounds where $n = 1$ and $m = 0$ or 1 are preferred.

When using the monomers of the invention in a copying layer containing polyamide, no additions imparting compatibility are necessary which, on their part, may diffuse slowly out of the printing foil. Thus, it is also not necessary to hermetically seal the printing foil in plastic film in order to prevent blooming and loss of uniformity caused by diffusion of individual components and partial vaporization of substances imparting compatibility. Furthermore, the monomers of the invention may be employed in such high concentrations that very good light-sensitivities are achieved.

A monomer of the invention with a polar crystalline character, 1,3,3-trimethyl-1-acryloylaminomethyl-5-acryloylamino-cyclohexane, has such good compatibility, e.g., also in a concentration of 37.5 per cent by weight in a copying composition together with a polyamide prepared by condensation of equal parts of caprolactam, hexamethylene diammonium adipate and p,p'-diammonium dicyclohexyl methane adipate that, after storage for 9 months, no turbidity or exudation can be observed.

The monomers of the invention are easily prepared in known manner by the reaction of cycloaliphatic diamines with acrylic chloride or methacrylic chloride.

The preferred monomers of the invention have, as such, an extraordinarily low crystallization tendency. This may result, on the one hand, from the asymmetrical structure of the molecules and, on the other hand, also from the possibility of stereoisomer formation.

The monomers of the invention also may be used in combination with other monomers in photopolymerizable copying compositions. Suitable monomers are substantially all polyfunctional monomers, e.g. acrylates and methacrylates of polyhydric alcohols; acrylamides and methacrylamides of polyvalent aliphatic amines and the like. Particularly suitable are the acrylic and methacrylic esters of bisurethanes as described in copending application Ser. No. 212,372, filed Dec. 27, 1971.

As polyamides, there may be used all those types which are soluble in the conventional solvents or solvent mixtures (see German Offenlegungsschrift No. 1,522,469, page 4). Particularly suitable are mixed polyamides from ε-caprolactam, hexamethylene diammonium adipate and p,p'-diammonium cyclohexyl methane adipate. Suitable polyamides are indicated in German Offenlegungsschrift No. 1,522,469, page 4.

The monomers of the invention also may be combined with other polymers, e.g., copolymers of methacrylates and methacrylic acid, to give valuable photopolymerizable compositions.

Suitable initiators are, practically, all those compounds which are capable of forming radicals, upon the action of light, which may initiate radical polymerization. Examples thereof are: acyloins and acyloin ethers, such as benzoin or benzoin methyl ether or benzoin isopropyl ether, substituted and unsubstituted polynuclear quinones, such as anthraquinone, 2-ethyl-anthraquinone or 2-tert.-butyl-anthraquinone, acridine derivatives, e.g., 9-phenyl-acridine, 9-p-methoxyphenyl-acridine, 9-acetylamino-acridine, benz(a)-acridine; phenazine derivatives, e.g., 9,10-dimethyl-benz(a)-phenazine, 9-methyl-benz-(a)-phenazine; 10-methoxy-benz(a)-phenazine; quinoxaline derivatives, e.g., 6,4',-4''-trimethoxy-2,3-diphenyl-quinoxaline, 4',4''-dimethoxy-2,3-diphenyl-5-aza-quinoxaline, 4',4''-dimethoxy-2,3-diphenyl-5-aza-quinoxaline and quinazoline derivatives.

It is further possible to incorporate into the compositions inhibitors, hydrogen donors, dyes, pigments and other conventional additives.

The photopolymer compositions prepared with the compounds of the invention are suitable for the production of printing forms for relief, planographic, intaglio and screen printing, particularly for the production of relief and screen printing forms.

The preparation of the light-sensitive copying compositions is performed in the usual manner by applying the dissolved copying composition to a suitable support and drying or by pressing, extruding or calendering the copying composition to give self-supporting films. It is also possible to cast solutions or melts of the copying composition to give films. The films optionally may be laminated to a support.

Processing of the light-sensitive materials is performed in the usual manner by exposure and subsequent washing out of the unexposed layer parts, e.g., by mechanical rubbing or spraying under pressure, with a suitable solvent or solvent mixture.

The following examples further illustrate the preparation and application of some monomers of the invention. The relation between parts by weight and parts by volume corresponds to that between grams and cm³.

EXAMPLE 1

A solution of

| | | |
|---|---|---|
| 10 | parts by weight | of a mixed polyamide prepared by condensation of 33 parts by weight of Σ-caprolactam, 33 parts by weight of hexamethylene diammonium adipate, and 33 parts by weight of p,p'-diammonium dicyclohexyl methane adipate. |
| 4 | parts by weight | of 1,3,3-trimethyl-1-acryloyl-aminomethyl-5-acryloylamino-cyclohexane, and |
| 0.03 | part by weight | of benzoin isopropyl ether in |
| 35 | parts by volume | of methanol | is cast onto a horizontal glass plate between wooden frames so that, after complete drying, a film of about 1 mm thickness is obtained.

The completely transparent printing foil is exposed for 10 minutes in a vacuum copying frame through a combined negative original having halftone parts and text parts (halftone screen: 56 lines/cm). As the light source, there is used at a distance of 5 cm a tubular exposure device TLAK 40 W/05 of Moll, Solingen-Wald, Germany, with Philips tubes arranged closely side by side.

For developing the exposed printing foil, there is used a mixture of 60 parts by volume of ethanol, 20 parts by volume of n-propanol, and 20 parts by volume of water. For developing small test printing foils, a soft brush is suitable. For somewhat larger plates, a plush pad is used.

After development for 10 minutes with the brush in the described solvent mixture, a relief with sharp outlines is obtained which reproduces also the finest details of the original. The relief depth is 0.4 mm with the development method employed here.

The light-sensitive printing foil has a very good storability; even after storage for 7 months at room temperature, no crystallization or incompatibility can be observed.

The monomer used is prepared as follows:

85 parts by weight (0.5 mole) of isophorone diamine (1,3,3-trimethyl-1-aminomethyl-5-amino-cyclohexane) are dissolved in 500 parts by volume of methylene chloride and cooled to 5°C. This is followed by adding, with intense stirring from two different dropping funnels at the same speed, (a) a solution of 40 parts by weight of NaOH in 125 parts by volume of water and (b) a solution of 90.5 parts by weight of acrylic chloride in 75 parts by volume of methylene chloride. This addition is followed by stirring for 30 minutes at 5°C and for 1 hour at room temperature. The mixture is again cooled to 5°C and the liquid is filtered from the white precipitate. This is followed by washing twice with 100 parts by volume of cold water. The product has a wax-like character and crystallizes very slowly during 2 days upon drying in the open. Crude yield: 1.8 parts by weight (77.5 percent of theoretical). Even after repeated recrystallization, the compound could not be obtained with an exact melting point.

Melting point: 160° to 167°C

Analysis: calculated: C: 69.0  found: C: 68.9
H: 9.41  H: 9.8
N: 10.06  N: 9.7

EXAMPLE 2

The procedure is the same as in Example 1 but, instead of the monomer, there are used

| 6 parts by weight | of 1,3,3-trimethyl-1-acryloyl-aminomethyl-5-acryloylamino-cyclohexane, and |
| 1 part by weight | of acrylamide. |

The printing foil obtained is exposed for 4 minutes. After development, a relief printing form of excellent relief sharpness is obtained. The storability is similar to that described in Example 1.

EXAMPLE 3

The procedure is the same as in Example 1 but, instead of the monomer, there are used 2.5 g of 1,3,3-trimethyl-1-methacryloylaminocyclohexane (melting point: 130° to 136°C). Similarly good results are obtained.

EXAMPLE 4

A solution of

| 20 | parts by weight | of the mixed polyamide indicated in Example 1, |
| 6 | parts by weight | of the monomer used in Example 1 |
| 2 | parts by weight | of hexamethylene bisacrylamide, |
| 4 | parts by weight | of triethylene glycol diacrylate, and |
| 0.06 | part by weight | of benzoin isopropyl ether in |
| 70 | parts by volume | of methanol | is processed to give a cast film, exposed and developed as in Example 1. After development for 10 minutes, a 0.4 mm deep relief with sharp outlines is obtained which reproduces also the finest details of the original. The storability of the printing foil is excellent. Also after storage for 7 months at room temperature, no crystallization tendency can be observed.

EXAMPLE 5

A solution of

| 10 | parts by weight | of the mixed polyamide indicated in Example 1, |
| 2 | parts by weight | of the monomer used in Example 1, |
| 2 | parts by weight | of triethylene glycol diacrylate, |
| 2 | parts by weight | of the reaction product from 1 mole of 2,2,4-trimethyl-hexamethylene diisocyanate and 2 moles of hydroxyethyl methacrylate, and |
| 0.03 | part by weight | of benzoin isopropyl ether in |
| 35 | parts by volume | of methanol | is processed to give a cast film as in Example 1. The transparent film has a very good storability; also after storage for half a year, no exudation or crystallization tendency can be observed. After exposure and development as in Example 1, a relief of excellent sharpness and good resolution is obtained.

EXAMPLE 6

A solution of

| 20 parts by weight | of the mixed polyamide indicated in Example 1, |
| 4 parts by weight | of the monomer used in Example 1, |
| 4 parts by weight | of triethylene glycol diacrylate, |
| 2 parts by weight | of 2,2,4-trimethyl-hexamethylene-bisacrylamide, and |
| 2 parts by weight | of acrylamide in |
| 70 parts by volume | of methanol | is processed to give a cast film as in Example 1. The well dried, about 0.6 mm thick film is bonded by means of an adhesive (Adcote 503 of Du Pont de Nemours and Co., Wilmington, Del., U.S.A.) to a 0.3 mm thick aluminum sheet which has been electrolytically roughened and anodized. After exposure and development as in Example 1, a relief printing plate is obtained which can be directly used for letter-press printing. Regarding storability, relief sharpness, and resolution, the plate corresponds to those of the preceding examples.

EXAMPLE 7

A solution of

| 12 | parts by weight | of the mixed polyamide indicated in Example 1, |
| 2 | parts by weight | of the monomer indicated in Example 1, |
| 2 | parts by weight | of triethylene glycol diacrylate, |
| 2 | parts by weight | of the reaction product from 1 mole of 1,3,3-trimethyl-1-isocyanatomethyl-5-isocyanato-cyclohexane and 2 moles of hydroxyethyl methacrylate. |
| 0.05 | part by weight | of benzoin isopropyl ether |
| 35 | parts by volume | of methanol | is doctored onto "Perlon" gauze and then dried for 2 minutes at 100°C. After exposure and development as in Example 1, a screen printing stencil is obtained which is distinguished particularly by excellent mechanical properties.

EXAMPLE 8

A solution of

| 12 | parts by weight | of the mixed polyamide indicated in Example 1, |
| 2 | parts by weight | of the monomer indicated in Example 1, |
| 2 | parts by weight | of triethylene glycol diacrylate, |
| 2.4 | parts by weight | of the reaction product from 1 mole of 1,3,3-trimethyl-1-isocyanatomethyl-5-isocyanato-cyclohexane and 2 moles of hydroxypropyl methacrylate, and |
| 0.05 | part by weight | of benzoin isopropyl ether in |
| 35 | parts by volume | of methanol | is doctored onto "Perlon" gauze as in Example 7, dried and exposed under a text original and developed as in Example 1. A screen printing stencil is obtained which, due to the materials used, is distinguished particularly by good mechanical properties.

EXAMPLE 9

A solution of

| | | |
|---|---|---|
| 12 | parts by weight | of the mixed polyamide indicated in Example 1. |
| 2 | parts by weight | of the monomer indicated in Example 1. |
| 2.2 | parts by weight | of trimethylol propane |
| 2 | parts by weight | of the urethane monomer indicated in Example 8. |
| 0.05 | part by weight | of benzoin isopropyl ether in |
| 35 | parts by volume | of methanol | is doctored onto "Perlon" gauze, dried, exposed under a text original, and developed as in Example 7. A screen printing stencil is obtained which has similarly good properties as those described in Examples 7 and 8.

EXAMPLE 10

A solution of

| | | |
|---|---|---|
| 10 | parts by weight | of the mixed polyamide indicated in Example 1. |
| 2 | parts by weight | of the monomer used in Example 1. |
| 2 | parts by weight | of triethylene glycol diacrylate, |
| 2 | parts by weight | of 1,3-bis-acryloylaminomethyl-cyclohexane (melting point: 167 to 169°C), and |
| 0.05 | part by weight | of benzoin isopropyl ether in |
| 35 | parts by volume | of methanol | is processed to give a cast film, exposed, and developed as in Example 1. A 0.5 mm deep relief with sharp outlines is obtained. Relief sharpness, compatibility of the components within the photopolymer composition and storability are very good.

Instead of the monomer 1,3-bis-acryloylaminomethyl-cyclohexane, it is also possible to use the same quantity of the corresponding 1,4-isomer (melting point: 100° to 105°C). Similarly good results are obtained.

It will be obvious to those skilled in the art that many modifications may be made within the scope of the present invention without departing from the spirit thereof, and the invention includes all such modifications.

What is claimed is:

1. A photopolymerizable compound of the general formula

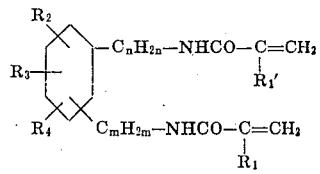

wherein
$R_1$ and $R_1'$ are selected from the group consisting of hydrogen atoms or methyl groups,
$R_2$, $R_3$, $R_4$ are selected from the group consisting of hydrogen atoms or alkyl groups with 1 to 4 carbon atoms,
$m$ is 0, 1 or 2, and
$n$ is 1 or 2.

2. A compound according to claim 1, in which $R_1$ and $R_1'$ are hydrogen atoms.

3. A compound according to claim 1, in which $R_2$, $R_3$, and $R_4$ are methyl groups.

4. 1,3,3-trimethyl-1-acryloylaminomethyl-5-acryloylaminocyclohexane.

5. 1,3,3-trimethyl-1-methacryloylaminomethyl-5-methacryloylaminocyclohexane.

* * * * *